United States Patent
Li et al.

(10) Patent No.: US 12,451,777 B2
(45) Date of Patent: Oct. 21, 2025

(54) SUPPORT DEVICE FOR STATOR OR ELECTRIC MOTOR

(71) Applicant: FCA US LLC, Auburn Hills, MI (US)

(72) Inventors: Dawei Li, Shanghai (CN); Xujin Ling, Shanghai (CN); Zhaoping Wang, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 135 days.

(21) Appl. No.: 18/456,544

(22) Filed: Aug. 28, 2023

(65) Prior Publication Data

US 2025/0079955 A1 Mar. 6, 2025

(51) Int. Cl.
*H02K 15/14* (2025.01)
*H02K 15/02* (2006.01)

(52) U.S. Cl.
CPC ............. *H02K 15/14* (2013.01); *H02K 15/02* (2013.01)

(58) Field of Classification Search
CPC ...... B23Q 1/763; B24B 41/067; H02K 15/24; H02K 15/14; H02K 15/02
See application file for complete search history.

(56) References Cited

U.S. PATENT DOCUMENTS

| 4,040,527 A * | 8/1977 | Krieg | B60L 15/38 414/282 |
| 5,595,524 A * | 1/1997 | Gundy | B24B 5/36 451/5 |
| 6,119,564 A * | 9/2000 | Newman | B23Q 1/76 82/162 |
| 2021/0016400 A1 * | 1/2021 | Daly | B24B 41/067 |
| 2022/0324045 A1 * | 10/2022 | Arcioni | B23H 9/10 |

FOREIGN PATENT DOCUMENTS

WO WO-9322818 A1 * 11/1993 ......... H02K 15/0037

* cited by examiner

*Primary Examiner* — Bradley Duckworth
(74) *Attorney, Agent, or Firm* — Jeremy J. Klobucar

(57) ABSTRACT

A system and method associated with a stator support device is provided for use in supporting a stator of an electric motor during manufacturing thereof. The stator support device includes a base platform for supporting the stator and facilitating transport of the stator during manufacturing. At least two rollers are spaced apart from each other a predetermined distance along a width of the base platform. Each of the rollers includes a frame structure securing the rollers in spaced relation to the base platform, wherein the predetermined distance is a function of an external diameter of the stator. The support device, via the rollers, is configured to receive and support the stator in spaced relation to the base platform. The rollers are configured to selectively i) maintain a stationary position of the stator, and ii) facilitate rotation of the stator about its longitudinal axis relative to the base platform.

11 Claims, 3 Drawing Sheets

SUPPORT DEVICE FOR STATOR OR ELECTRIC MOTOR

FIELD

The present application relates generally to the manufacturing of stators for electric motors and, more particularly, to a support device for supporting the stator during its manufacturing process.

BACKGROUND

In conventional manufacturing processes for assembling a stator of an electric motor, the stator is placed on and supported by a pallet having stator holding supports that maintain the stator in a fixed position/orientation on the pallet. To move the stator relative to the pallet, the stator is removed from the holding supports and rotated either manually by an operator using a rotating device or automatically by a lifting and rotating arrangement typically incorporated in the manufacturing line. These options have shown to be inefficient and, in the case of the automated process, further require the capital and operating expense of a dedicated machine associated with the manufacturing line. Accordingly, while such conventional stator support devices and rotating arrangements for the same do work for their intended purpose, there remains an opportunity for improvement in the relevant art.

SUMMARY

In accordance with an exemplary aspect of the invention, a stator support device is provided for use in supporting a stator of an electric motor during manufacturing thereof. In one exemplary implementation, the stator support device includes a base platform configured to support the stator and facilitate transport of the stator during its manufacturing process. At least two rollers are spaced apart from each other a predetermined distance along a direction of a width of the base platform. Each of the at least two rollers includes a frame structure securing the rollers in spaced relation to the base platform, wherein the predetermined distance is a function of an external diameter of the stator. The support device, via the at least two rollers, is configured to receive and support the stator in spaced relation to the base platform, and wherein the at least two rollers are configured to selectively i) maintain a stationary position of the stator, and ii) facilitate rotation of the stator about its longitudinal axis relative to the base platform.

In some implementations, the base platform and at the least two rollers form a pallet configured for supporting and transporting the stator during its manufacturing process. In some implementations, the at least two rollers include two pair of rollers.

In some implementations, the support device includes a rotational torque generator configured to selectively engage at least one of the at least two rollers to rotationally drive the at least one roller thereby correspondingly rotating the stator while the stator remains supported by and positioned on the at least two rollers.

In some implementations, the support device includes system utilizing a rotational torque generator configured to selective engage an outer surface of the stator to rotate the stator relative to the base platform while the stator remains supported by and positioned on the at least two rollers.

According to another example aspect of the invention, a method for supporting a stator during a manufacturing process thereof is presented. In one exemplary implementation, the method includes receiving the stator onto rollers coupled to a stator support pallet, wherein the rollers support the stator in spaced relation to the pallet and facilitate maintaining the stator in a stationary position and providing for rotation of the stator relative to the support pallet; and selectively rotating the stator relative to the support pallet to position a predetermined feature of the stator in a predetermined rotational orientation relative to the support pallet.

In some implementations, selectively rotating the stator relative to the support pallet includes rotationally driving at least one roller of the rollers coupled to the stator pallet thereby correspondingly rotating the stator supported by the rollers.

In some implementations, rotationally driving the at least one roller of the rollers includes engaging a rotational torque generator with the at least one roller.

In some implementations, selectively rotating the stator relative to the support pallet includes rotationally driving the stator, which in turn rotates the rollers to facilitate rotation of the stator relative to the support pallet. In some implementations, rotationally driving the stator includes engaging a rotational torque generator with an exterior surface of the stator.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
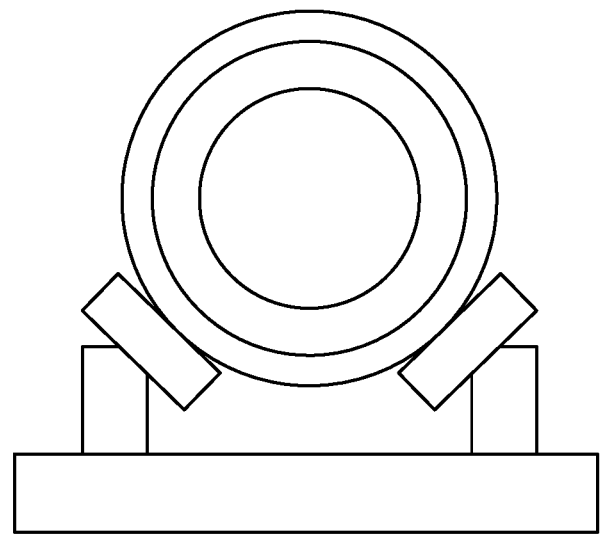
FIG. 1 is a view of a prior art support device limited to holding the stator in a static position.

As previously discussed, there remains a need for improvement in the art of electric motor manufacturing and, in particular, manufacturing of the stator of the electric motor. Conventional stator holding devices, such as shown in FIG. 1, hold the stator in a static position once placed on the fixed holding supports of the holding device. As a result, the stator remains in a fixed position while it rests on the holding supports and must be raised off the supports for movement. This requires additional manufacturing steps and equipment, which adds costs and reduces efficiency of the manufacturing process. It will be appreciated that the term stator, as used herein, refers to the stator in various aspects or stages of its manufacturing process including but not limited to the stator core; further assembly of any of the following: insulation paper, stator winding coil, bus-bar and varnish coating; and the stator assembly.

Stators typically require rotation during assembly to orient components of the stator in a position to provide access to an operator or installer, and/or to align certain components of the stator with a fixed position of associated automated assembly equipment. For example, the stator typically requires rotation about its central longitudinal axis to a certain rotational orientation for installation of bus bar lead wires to the hairpin winding wires. Another example involves application of a varnish coating to fill gaps in the stator slots and winding coils. A trickling method is often utilized to apply the varnish, which requires rotating the stator about its central axis. With the conventional stator holding devices, a dedicated manufacturing station with a dedicated robotic device is typically required to raise the stator from the holding device and then rotate the same for application of the varnish.

Accordingly, an improved stator holding device in the form of a stator pallet has been developed and provides for rotation of the stator while the stator remains supported on the stator pallet. This eliminates the need to remove the stator from the pallet to rotate the same, which reduces equipment costs and improves manufacturing efficiency.

Figure 2:
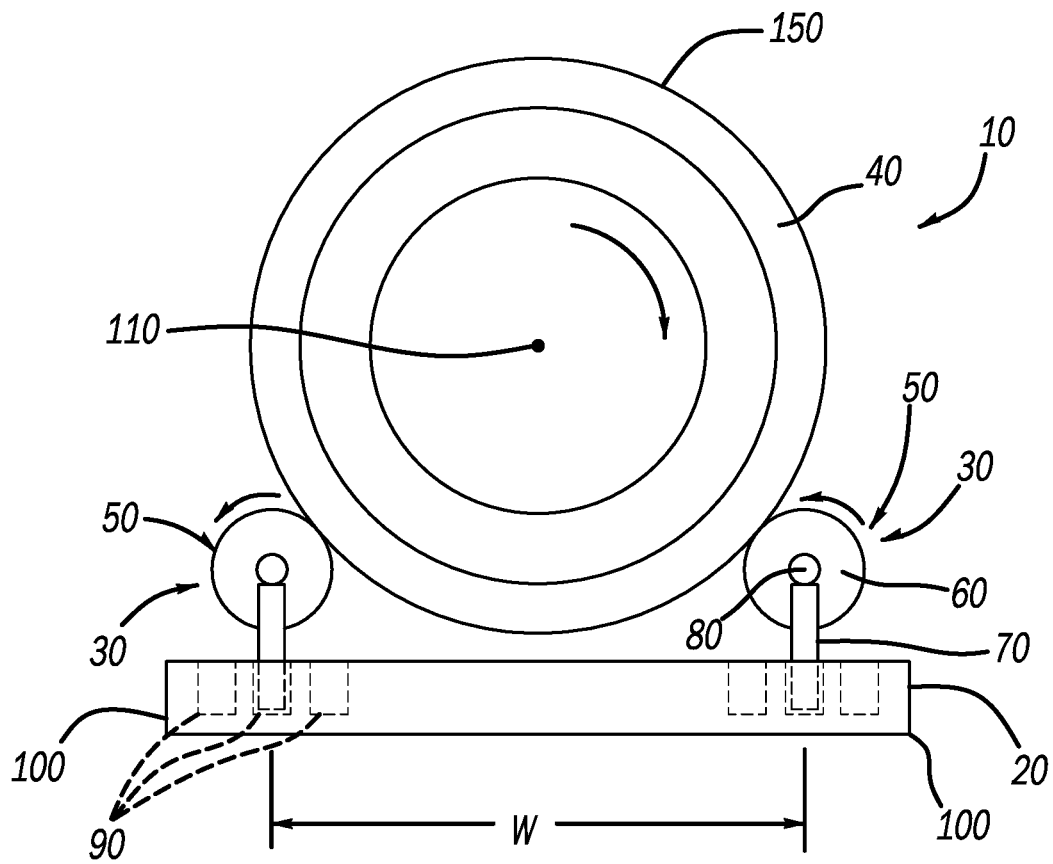
FIG. 2 is a front view in schematic form of a stator support device in the form of a stator pallet for rotationally supporting a stator according to the principles of the present disclosure.
Figure 3:
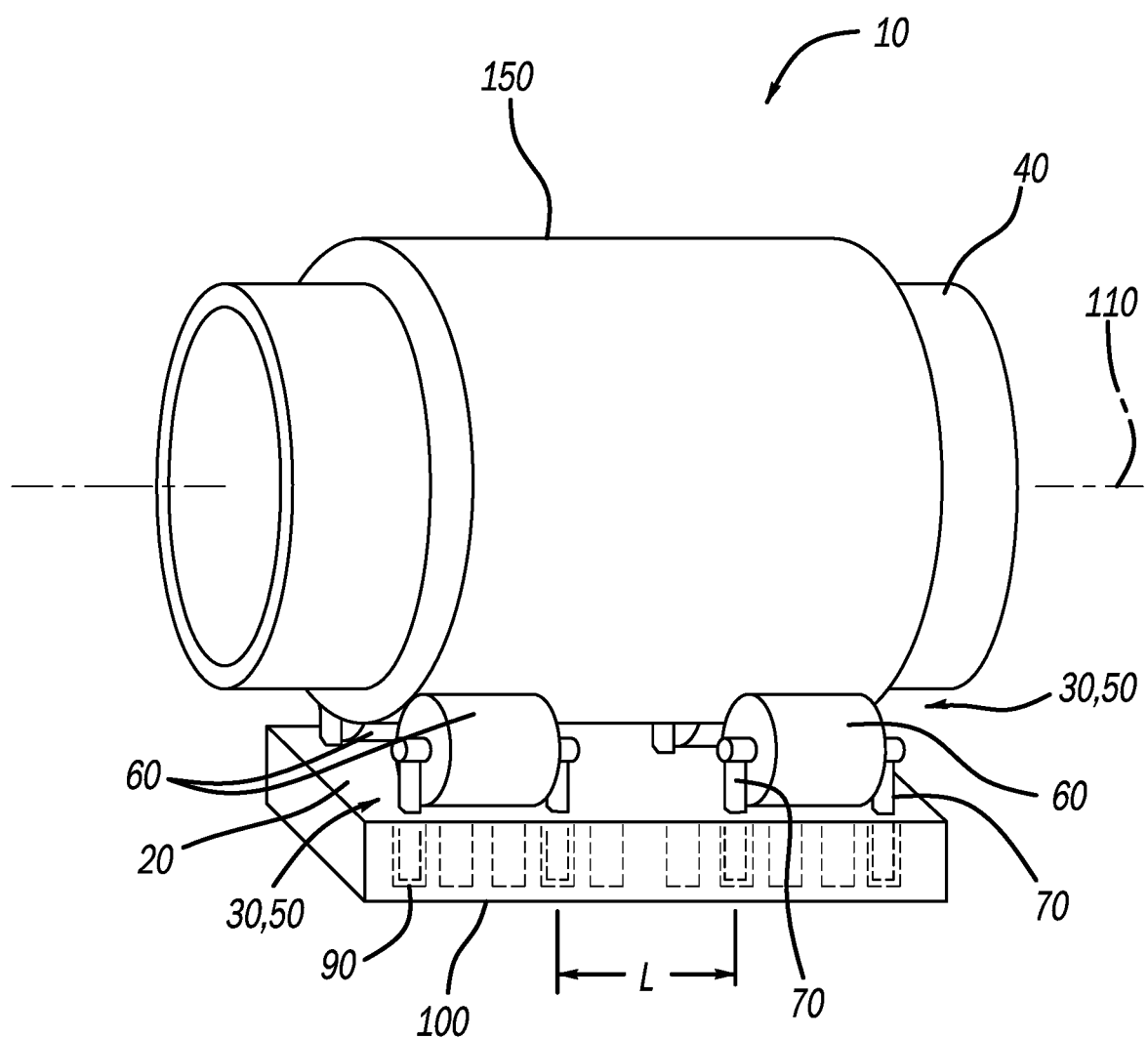
FIG. 3 is a side view in schematic form of the stator support device in the form of the stator pallet according to the principles of the present disclosure.

Referring now to FIGS. 2 and 3, an example of the improved stator pallet is shown and identified with reference numeral 10. In one exemplary implementation, the stator pallet 10 includes a base or base platform 20 having support devices 30 coupled thereto for supporting an exemplary stator schematically shown as 40. The support devices 30 support stator 40 spaced apart from base platform 20. In the example illustrated, the support devices 30 include roller assemblies 50 having one or more rollers 60 and a frame 70 for rotationally supporting the rollers 60 about their axis 80. The frame 70 may be in the form of posts or the like which are connected to the base platform 20. In one example implementation, the posts 70 are permanently fixed to base platform 20. In another example implementation, the posts 70 are removable secured to one of various receiving receptacles 90 in the base platform 20. In this example, the rollers 60 can be positioned spaced apart from each other along a width (W) of the base platform 20 at predetermined distances designed to accept various stators having different diameters on the same stator pallet 10.

The stator pallet 10 includes at least one roller assembly 50 positioned proximate opposed sides 100 of the base platform 20 for supporting the stator 40. In one example, each side 100 of base platform 20 may include two roller assemblies spaced apart a distance L along a direction of a longitudinal central axis of rotation 110 of stator 40. It will be appreciated that base platform 20 may include various different numbers of roller assemblies 50 proximate each side 100 of base platform 20 depending on the characteristics of the particular stator 40 being supported. For this reason, each side 100 of base platform 20 may include various receptacles 90 for receiving various numbers of roller assemblies 50 and/or various different lengths (in the longitudinal direction) of roller assemblies 50.

The rollers 60 of roller assemblies 50 may be formed of various different industrial materials suitable for supporting typical stator weights and having an appropriate surface roughness or friction such that when, for example, a roller 60 is rotationally driven, the stator 40 will correspondingly rotate and vice-versa.

As previously discussed, the stator pallet 10 configuration with roller assemblies 50 supporting stator 40 provide for the stator 40 to be rotated to a desired rotational or angular orientation relative to base platform 20 while stator 40 remains supported on rollers 60. In other words, stator 40 can be rotated without removing stator 40 from rollers 60 and thus stator pallet 10.

In operation, stator pallet 10 advantageously provides for stator 40 being rotatable on rollers 60 using various different techniques. In one example, stator 40 can be manually rotated by an operator by applying rotative force to the stator 40 which will in turn rotate the stator 40 and the rollers 60. For various stator designs, including lighter weight stators, this may be a lower cost and lower complexity implementation.

Figure 4:
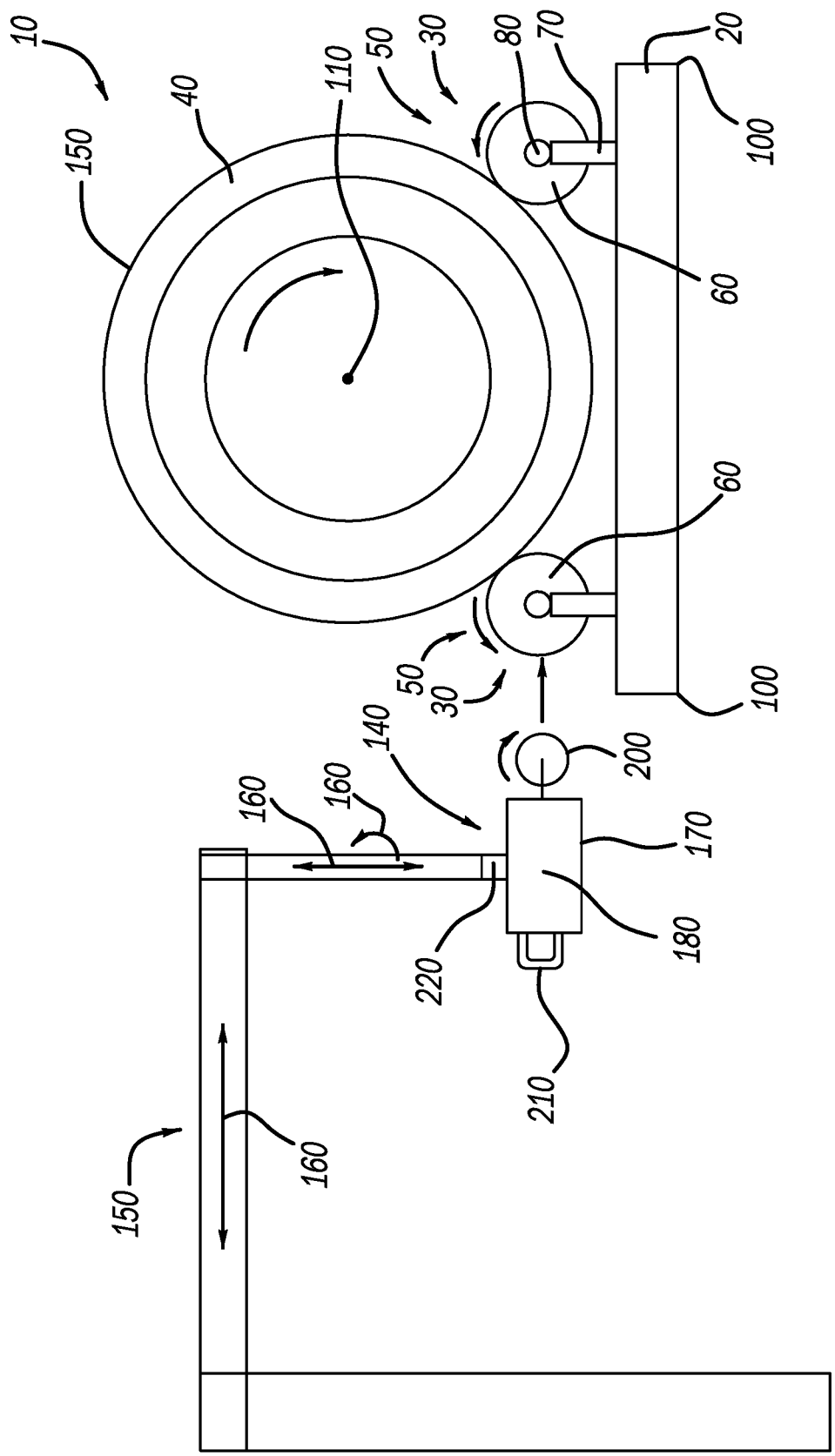
FIG. 4 is an example schematic view of an example manufacturing arrangement incorporating the stator pallet of FIGS. 2 and 3 with an example driving device configured for driving a roller of the stator pallet to rotate the stator according to the principles of the present disclosure.

In other examples, stator 40 may be rotated with an assist device. With additional reference to FIG. 4 and continuing reference to FIGS. 2 and 3, an exemplary assist device is shown at reference numeral 140. Assist device 140 can be any suitable device configured to apply rotative force to an external surface of at least one of rollers 60 to cause corresponding rotation of stator 40. Assist device 140 can be a portable device, such as a handheld tool arrangement, usable by an operator to apply rotative force to a roller 60. Alternatively or in connection therewith, assist device 140 can be selectively or permanently coupled to a support system, such as the example system 150 shown in FIG. 4. This support system 150 can be used to hold the assist device 140 and allow the operator to move the assist device 140, while coupled thereto, in various directions 160 to selectively engage assist device 140 with a roller 60. This will then rotate stator 40 to a desired rotation orientation relative to base platform 20.

Alternatively, the support system 150 can be an automated system, such as a robotic system controlled via a controller or control system, configured to automatically engage assist device 140 with roller 60 to rotate stator 40. In another example, assist device 140 could be coupled to stator pallet 10 and configured for selective engagement with an outer surface of roller 60. In yet another example, assist device may alternatively be used in the various different manners above to engage an outer surface 150 of the stator 40 to rotate stator 40 relative to base platform 20.

In the example implementation illustrated, assist device 140 may include a housing 170 having a motor 180 and a rotationally driven wheel, roller or the like 200 configured to be engaged with the outer surface of roller 60 to rotationally drive the same to rotate stator 40. Housing 170 may optionally include a handle 210 to facilitate holding and/or moving the assist device 140 by the operator. Assist device 140 may optionally include a quick-connect/disconnect system 220 for coupling/decoupling assist device 140 to support system 150.

In an exemplary method of operation, the stator 40 can be positioned on rollers 60 of stator pallet 10, such as by a robot when stator pallet 10 is at an appropriate manufacturing station. At this stage of the manufacturing process, stator 40 may be in the form of a stator core. When stator 40 is at manufacturing stations and/or states where a specific rotational position of stator 40 is desired/required, stator 40 may be rotated to such position while remaining seated on rollers 60. As discussed above, such rotation may be performed manually or with assistance, such as by using assistance device 140. Assistance device 140 may be used to rotationally engage rollers 60 and/or stator 40 to rotate stator 40 to the desired rotational orientation.

It will be appreciated that the term "controller" or "control system" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A support device for use in supporting a stator of an electric motor during manufacturing of the stator, the support device comprising:
    a base platform configured to support the stator and facilitate transport of the stator during its manufacturing process;
    at least two rollers spaced apart from each other by a predetermined distance of one of a plurality of selectable predetermined distances along a direction of a width of the base platform, each of the at least two rollers including a frame structure removably securing the at least two rollers in spaced relation to the base platform and each other wherein the predetermined distance is a function of an external diameter of the stator;
    wherein the support device, via the at least two rollers, is configured to receive and support the stator in spaced relation to the base platform, and wherein the at least two rollers are configured to selectively i) maintain a stationary position of the stator, and ii) facilitate rotation of the stator along its longitudinal axis relative to the base platform, and
    wherein the base platform includes a plurality of receptacles extending along the width direction of the base platform and configured for selectively receiving the frame structures of the at least two rollers in one of the plurality of the selectable predetermined distances from each other to removably secure the at least two rollers in different positions to support stators of different external diameters, the plurality of receptacles being greater in number than a total number of the frame structures of the at least two rollers.

2. The support device of claim 1, wherein the base platform and the at least two rollers form a pallet configured for supporting and transporting the stator during its manufacturing process.

3. The support device of claim 1, further comprising a rotational torque generator configured to selectively engage at least one of the at least two rollers to rotationally drive the at least one roller thereby correspondingly rotating the stator while the stator remains supported by and positioned on the at least two rollers.

4. The support device of claim 1, further comprising a rotational torque generator configured to selectively directly engage an outer surface of the stator to rotate the stator relative to the base platform while the stator remains supported by and positioned on the at least two rollers.

5. The support device of claim 1, wherein the at least two rollers include two pair of rollers.

6. A method for supporting a stator during a manufacturing process of the stator, the method comprising:
    receiving the stator on at least two rollers having a frame structure removably secured to a stator support pallet and spaced apart from each other by a predetermined distance of a plurality of selectable predetermined distances along a direction of a width of the support pallet, wherein the rollers support the stator in spaced relation to the pallet and facilitate i) maintaining the stator in a stationary position, and ii) providing for rotation of the stator core relative to the support pallet, and wherein the support pallet includes a plurality of receptacles extending along the width direction of the support pallet and configured for selectively receiving the frame structures of the at least two rollers in one of the plurality of the selectable predetermined distances from each other to removably secure the at least two rollers in different positions to support stators of different external diameters, the plurality of receptacles being greater in number than a total number of the frame structures of the at least two rollers; and
    selectively rotating the stator relative to the support pallet to position a predetermined feature of the stator in a predetermined rotational orientation relative to the support pallet.

7. The method of claim 6, wherein selectively rotating the stator relative to the support pallet comprises rotationally driving at least one roller of the at least two rollers coupled to the support pallet thereby correspondingly rotating the stator supported by the at least two rollers.

8. The method of claim 7, wherein rotationally driving the at least one roller of the at least two rollers includes engaging a rotational torque generator with the at least one roller.

9. The method of claim 6, wherein selectively rotating the stator relative to the support pallet comprises rotationally driving the stator, which in turn rotates the at least two rollers to facilitate rotation of the stator relative to the support pallet.

10. The method of claim 9, wherein rotationally driving the stator includes engaging a rotational torque generator directly with an exterior surface of the stator.

11. The method according to claim 6, further comprising, based on an external diameter size of the stator, removably securing the at least two rollers in a subset of receptacles of the plurality of receptacles at the predetermined distance of the plurality of the selectable predetermined distances.

* * * * *